US006644151B2

(12) United States Patent
Förster et al.

(10) Patent No.: US 6,644,151 B2
(45) Date of Patent: Nov. 11, 2003

(54) APPARATUS FOR THE CONTINUOUS, CHIPLESS SEPARATION OF INDIVIDUAL, IDENTICAL DISK-SHAPED BLANKS OR RODS FROM ROUND BAR-SHAPED WORKPIECES

(75) Inventors: Wilfried Förster, Gröditz (DE); Roland Stephan, Riesa (DE); Joachim Schlegel, Freiberg (DE)

(73) Assignee: Mannesmann AG, Düsseldorf (DE)

( * ) Notice: Subject to any disclaimer, the term of this patent is extended or adjusted under 35 U.S.C. 154(b) by 97 days.

(21) Appl. No.: 09/791,404

(22) Filed: Feb. 21, 2001

(65) Prior Publication Data

US 2001/0022124 A1 Sep. 20, 2001

(30) Foreign Application Priority Data

Mar. 20, 2000 (DE) .......................... 100 14 935

(51) Int. Cl.[7] ................................. B21H 1/06
(52) U.S. Cl. ........................... 82/101; 82/110
(58) Field of Search ................. 82/101, 46, 47, 82/54, 56, 59, 83, 84, 89, 98, 110, 131; 83/170; 72/70, 71, 121, 204, 327

(56) References Cited

U.S. PATENT DOCUMENTS

| 1,885,188 | A | * | 11/1932 | Deutsch | ...................... 82/91 |
|---|---|---|---|---|---|
| 1,890,693 | A | | 12/1932 | Munro | |
| 2,771,662 | A | * | 11/1956 | Ziska | ........................... 82/83 |
| 3,602,025 | A | * | 8/1971 | Awano et al. | ................... 72/71 |
| 3,611,769 | A | * | 10/1971 | Hencl | ............................. 72/71 |
| 3,756,055 | A | * | 9/1973 | Marcovitch | .................... 72/71 |
| 4,014,234 | A | * | 3/1977 | Spengler | ..................... 83/162 |
| 4,084,303 | A | * | 4/1978 | Skinner | ..................... 29/895.3 |
| 4,165,998 | A | * | 8/1979 | Adams et al. | ................ 156/64 |
| 4,302,958 | A | * | 12/1981 | Andriessen et al. | .......... 72/71 |
| 5,868,050 | A | * | 2/1999 | Feldmeier | .................... 72/128 |

FOREIGN PATENT DOCUMENTS

| DE | OS 16 02 950 | 5/1970 |
|---|---|---|
| DE | 44 15 091 C1 | 1/1996 |
| DE | 196 31 534 A1 | 1/1998 |
| DE | 197 22 839 C1 | 10/1998 |
| DE | 198 07 159 C1 | 3/1999 |
| WO | WO 99/07495 A2 | 2/1999 |

* cited by examiner

Primary Examiner—Henry W. H. Tsai
(74) Attorney, Agent, or Firm—Henry M. Feiereisen

(57) ABSTRACT

Apparatus for the continuous, chipless separation of individual, identical pieces from a solid round workpiece, includes at least two cutting rollers, cooperating with one another, for separating and rolling the workpiece. Each of the cutting rollers is defined by a separating portion and has a coil, with the height of the coil of one cutting roller being equal or slightly greater than the radius of the workpiece in the separating portion, and with the coil of the other cutting roller so configured as to eliminate a collision in the separating portion with the coil of the one cutting roller.

11 Claims, 7 Drawing Sheets

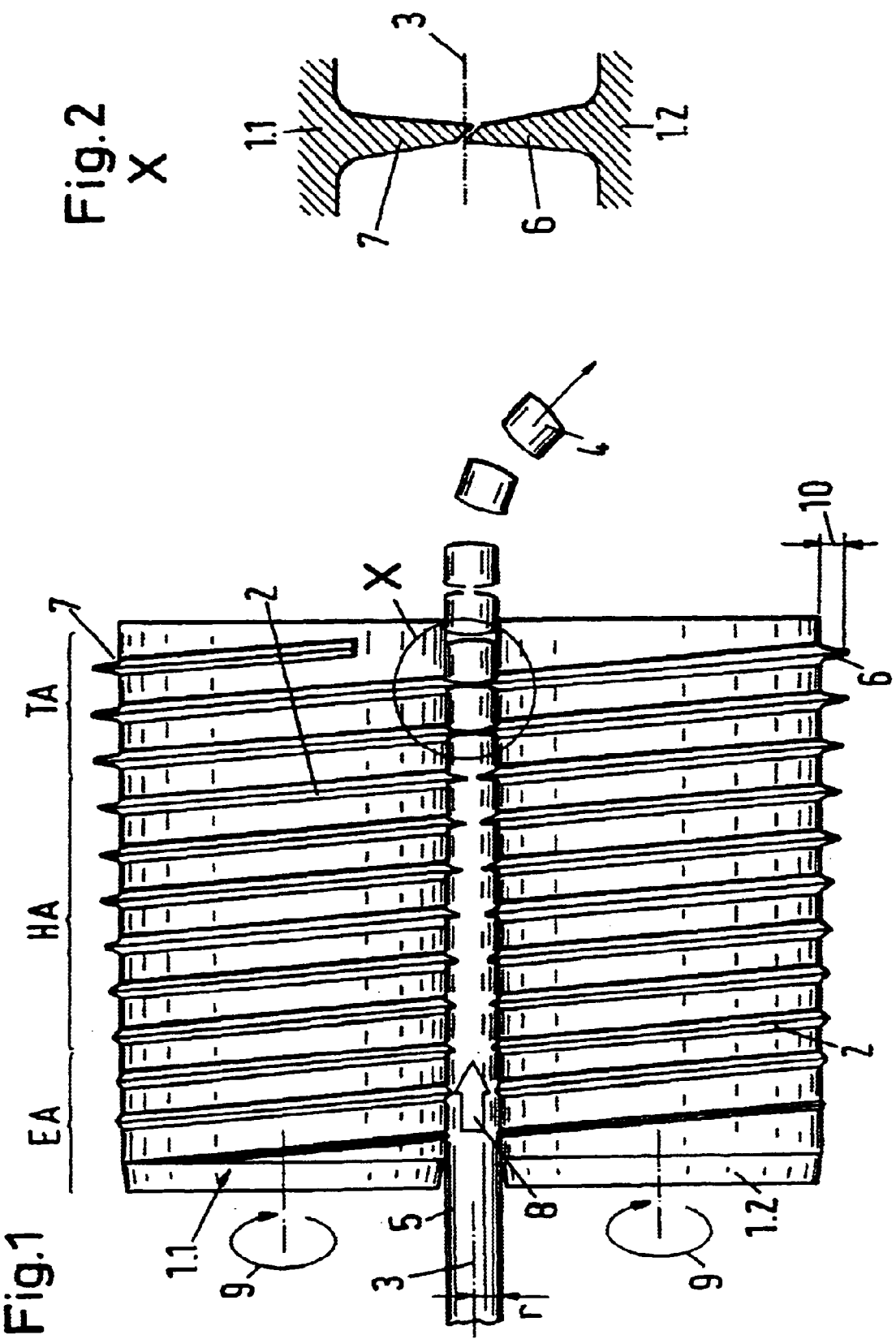

APPARATUS FOR THE CONTINUOUS, CHIPLESS SEPARATION OF INDIVIDUAL, IDENTICAL DISK-SHAPED BLANKS OR RODS FROM ROUND BAR-SHAPED WORKPIECES

CROSS-REFERENCES TO RELATED APPLICATIONS

This application claims the priority of German Patent Application Serial No. 100 14 935.9, filed Mar. 20, 2000, the subject matter of which is incorporated herein by reference.

BACKGROUND OF THE INVENTION

The present invention relates, in general, to an apparatus for the continuous, chipless separation of individual, identical disk-shaped blanks or rods from round bar-shaped workpieces.

German patent publication DE-OS 16 02 950 discloses a method and apparatus for separating individual rings from tubular workpieces and describes a separating and rolling device having at least two cutting rollers in opposite disposition. The cutting rollers have coils which progressively increase in height from the start towards the end to thereby form a narrowing intermediate space. The tubular workpiece is supported on the inside by an inserted mandrel which projects on both sides beyond the workpiece, with their projecting ends rolling on one of both rollers.

International publication WO 99/07495 describes an arrangement with a separating and rolling device and an inlet gutter positioned upstream of the separating and rolling device. A feed unit advances the workpiece from the inlet gutter to the separating and rolling device and imparts a rotation upon the workpiece. Arranged immediately upstream of the separating and rolling device is an induction heat unit with an anterior buffer zone. The separating and rolling device has at least two cutting rollers arranged about the tubular workpiece being worked on and driven in a common direction. The cutting rollers are coupled to one another in a positive manner and have thread-like cutting edges.

It would be desirable and advantageous to provide an apparatus that implements a continuous, chipless separation of individual, identical blanks from a solid workpiece such as round bars.

SUMMARY OF THE INVENTION

The present invention provides for a separating and rolling device which has at least two cutting rollers for processing a solid round workpiece, with each of the cutting rollers having a coil and including a separating portion, wherein the coil of at least one of the cutting rollers has in the separating portion a height which is equal or slightly greater than the radius of the workpiece, and wherein the coil of the other one of the cutting rollers is so configured as to avoid in the separating portion a collision with the coil of the one of the cutting rollers.

In accordance with one embodiment of the present invention, the two cutting rollers are disposed in opposite relationship and interconnected in positive manner and driven in a common direction. The coils of both cutting rollers have in an entry portion and a primary portion up to the separating portion a height which increases to a level that, measured from a tip of the coil, slightly exceeds the radius of the workpiece being cut. To prevent a collision in the separating portion, the confronting cutting edges of the coils of the both cutting rollers have tip configurations pointing in opposite directions.

There are many variations that generally follow the concept outlined here for preventing a collision of the coils of opposing cutting rollers in the separating portion. One option may include a configuration in which the coil of only one of the cutting rollers increases in height while the height of the coil of the other one of the two cutting rollers remains constant. Another option may include a configuration in which the height of the coils of the cutting rollers increases in an alternating and oscillating manner in the separating portion.

When the separating and rolling device has only two cutting rollers, it is difficult to keep a precise central guidance of the round solid workpiece as a consequence of the availability of a geometrically very small gap. To address this problem, it is proposed in accordance with the present invention, to provide a guiding gib which is configured as endless sliding shoe guided in chain links. In this manner, the round workpiece is secured in the spaces between the coils and conjointly pulled by the coils of the cutting rollers as a result of the coil pitch.

According to another feature of the present invention, the guidance of the round workpiece may also be implemented by a separating and rolling device having three cutting rollers. In one variation, the three cutting rollers have a same base diameter, are driven in a common direction, interconnected in a positive manner and arranged in 120° offset disposition, thereby defining a top roller and two bottom rollers. Each of the cutting rollers has a coil which increases steadily in height in the entry portion and the primary portion, wherein only the coil of the top roller has in the separating portion a height which increases to a level that slightly exceeds the radius of the workpiece to be cut. A collision of the coil tip of the top roller with the surface of both bottom rollers can be avoided by configuring the radius r of the workpiece according to the requirement r≧0.366 R wherein R is the base radius of the three cutting rollers.

It is also possible to so approach both bottom rollers as to realize a contact therebetween, so that the offset arrangement of the cutting rollers is less than 120°. This configuration allows a separation of a round workpiece of even smaller radius r, whereby in this case r≧0.2601 R.

A further minimization of the initial diameter of the round workpiece can be realized when the three cutting rollers have different base diameters, whereby the top roller has a greater base diameter than the identical base diameters of the bottom rollers.

According to another feature of the present invention, the bottom rollers may coast idly, i.e. is not driven separately, or may be driven separate from the top roller, with matching rotational speed.

BRIEF DESCRIPTION OF THE DRAWING

Other features and advantages of the present invention will be more readily apparent upon reading the following description of preferred exemplified embodiments of the invention with reference to the accompanying drawing, in which:

FIG. 1 is a longitudinal section of a first embodiment of a separating and rolling device according to the present invention;

FIG. 2 is a sectional view, on an enlarged scale, of a detail marked X in FIG. 1;

DETAILED DESCRIPTION OF PREFERRED EMBODIMENTS

Figure 1A:
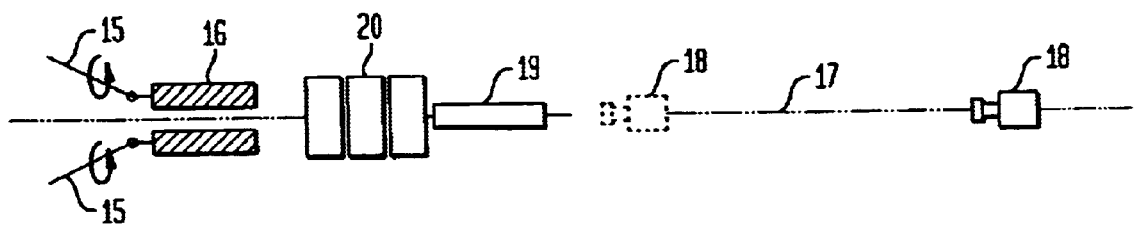
FIG. 1a is a general overview of an exemplified arrangement for processing a round bar-shaped solid workpiece, having incorporated therein a separating and rolling device according to the present invention.

Turning now to the drawing, and in particular to FIG. 1, there is shown a longitudinal section of a first embodiment of a separating and rolling device according to the present invention, which is incorporated in an arrangement for processing a round bar-shaped solid workpiece, as shown schematically in FIG. 1a. According to FIG. 1a, the workpiece is transferred to an inlet gutter 17 for transport by a feed unit, e.g. a rotary drive 18 to the separating and rolling device 16 (shown here only schematically), whereby the rotary drive 18 imparts a rotation upon the workpiece shortly before entrance into the separating and rolling device 16. In the end position of the rotary drive 18, as shown in dotted line, the workpiece is released and coasts by itself into the separating and rolling device 16, while the rotary drive 18 returns to the initial position for grabbing a further workpiece. Suitably, a buffer zone 19 is provided upstream of the separating and rolling device 11 to implement an end-to-end sequential positioning of workpieces. An induction heat unit 20 is shown here in a location between the separating and rolling device 11 and the buffer zone 19 for heating the workpiece and thereby decrease its resistance to deformation. Persons skilled in the art will understand that the arrangement of the buffer zone 19 and the induction heat unit 20 is optional and may be omitted, if desired.

Turning now again to FIG. 1, the separating and rolling device includes two cutting rollers 1.1, 1.2 for the continuous separation of identically sized disk-shaped blanks 4 from a workpiece in the form of a round solid bar 5 advancing in a direction indicated by arrow 8 and having a radius r. The cutting rollers 1.1, 1.2 are each provided with a coil 2 and rotate in a common direction as indicated by arrow 9. A positive connection of the cutting rollers 1.1, 1.2 ensures a synchronous operation for the cutting procedure. The positive connection may be implemented, for example, by disposing articulated spindles 15 (FIG. 1a) between the cutting rollers of the separating and rolling device 16 and a suitable gear mechanism. Such a configuration is generally known to the artisan and thus has not been described in more detail for sake of simplicity.

Each of the cutting rollers 1.1, 1.2 has a main body subdivided in different sections, i.e. entry portion EA which terminates in a primary portion HA. Following the primary portion HA is a separating portion TA. As shown in FIG. 1, the coils 2 of the cutting rollers 1.1, 1.2 have cutting edges 6, 7, and are characterized by a steady increase in height commencing from the entry portion EA via the primary portion HA into the initial zone of the separating portion TA. In the separating portion TA, the cutting edges 6, 7 of the coils 2 have a height 10 which slightly exceeds the radius of the round bar 5 to be cut.

In order to prevent a collision of confronting cutting edges 6, 7 of the coils 2 in the separating portion TA, the tips of the confronting cutting edges 6, 7 are directed alternately to the left and to the right, and thus away from one another, as shown in particular in FIG. 2 which is a sectional view, on an enlarged scale, of a detail marked X in FIG. 1. Dash-dot line 3 indicates the center axis of the round bar 5 for better understanding.

Figure 1B:
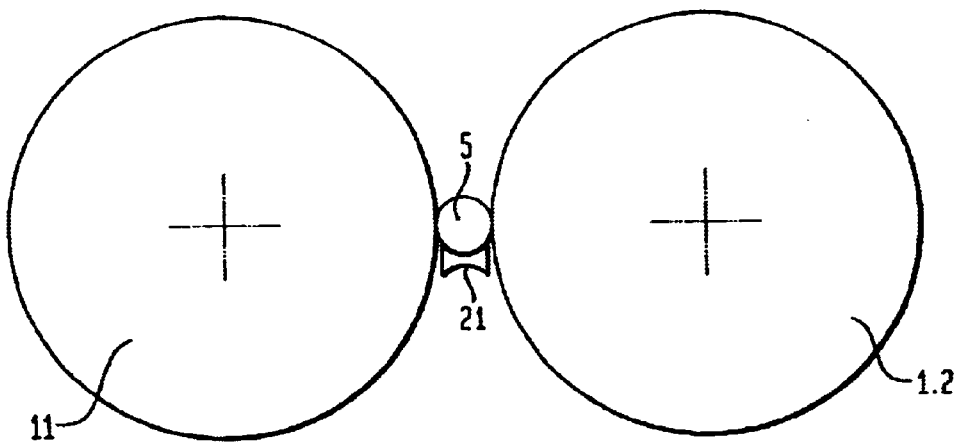
FIG. 1b is a schematic view of a two roller configuration with illustration of a guiding gib.
Figure 1C:
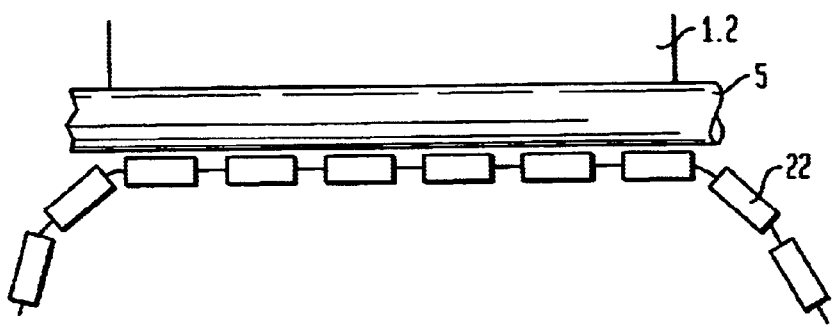
FIG. 1c is another schematic view of the two roller configuration of FIG. 1b.
Figure 3:
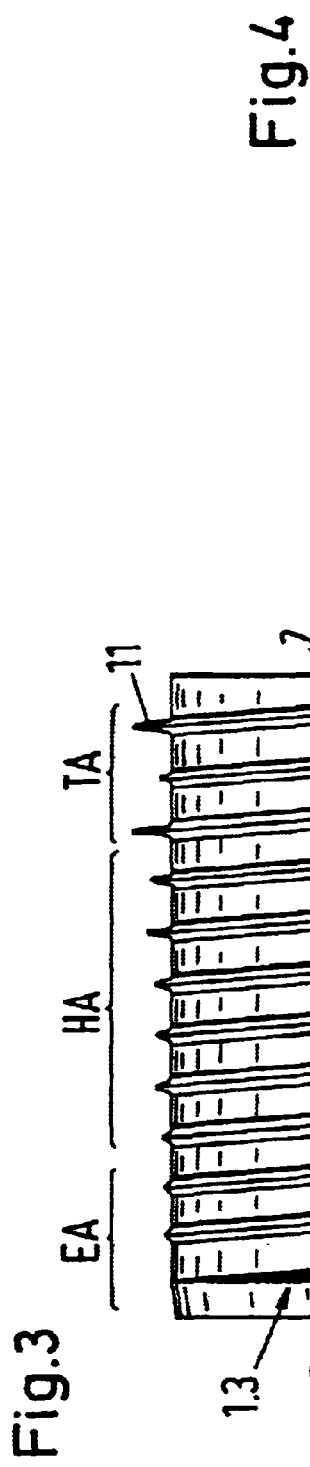
FIG. 3 is a longitudinal section of a second embodiment of a separating and rolling device according to the present invention.

In a configuration of the separating and rolling device with only two cutting rollers 1.1, 1.2, it is difficult to keep a precise central guidance of the round solid workpiece 5 as a consequence of the availability of a geometrically very small gap. Therefore, a guiding gib is provided which is shown in FIGS. 1b and 1c in more detail and generally designated by reference numeral 21. The gib 21 is configured as endless sliding shoe 22 guided in chain links. In this manner, the round workpiece 5 is secured in the spaces between the coils 2 and conjointly pulled by the coils 2 of the cutting rollers 1.1, 1.2 as a result of the coil pitch Referring now to FIG. 3, there is shown a longitudinal section of a second embodiment of a separating and rolling device according to the present invention. Parts corresponding with those in FIG. 1 are denoted by identical reference numerals and not explained again. In this embodiment, provision is also made for an arrangement of only two cutting rollers 1.3, 1.4 for the continuous separation of identically sized disk-shaped blanks 4 from a workpiece in the form of a round solid bar 5. The increase in height of the coils 2 in the entry portion EA and the primary portion HA is comparable to the embodiment of FIG. 1. However, in order to prevent a collision of confronting cutting edges 11, 12 in the separating portion TA, the cutting edges 11, 12 are arranged in alternating sequence and in oscillating manner.

Figure 4:
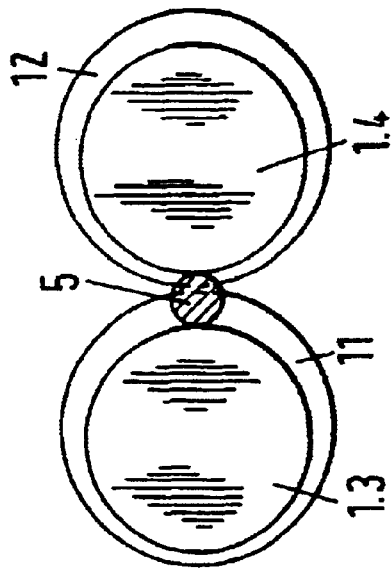
FIG. 4 is a schematic, partially sectional view, on a reduced scale, of the cutting rollers of FIG. 3 in the separating portion.

This type of arrangement is shown in a simple way in FIG. 4, whereby the height 10 of the cutting edges 11, 12 is ensured to slightly exceed the radius r of the round bar 5. The coils 2 have thus a configuration in which the height steadily increases and decreases about 180°, respectively.

Figure 5:
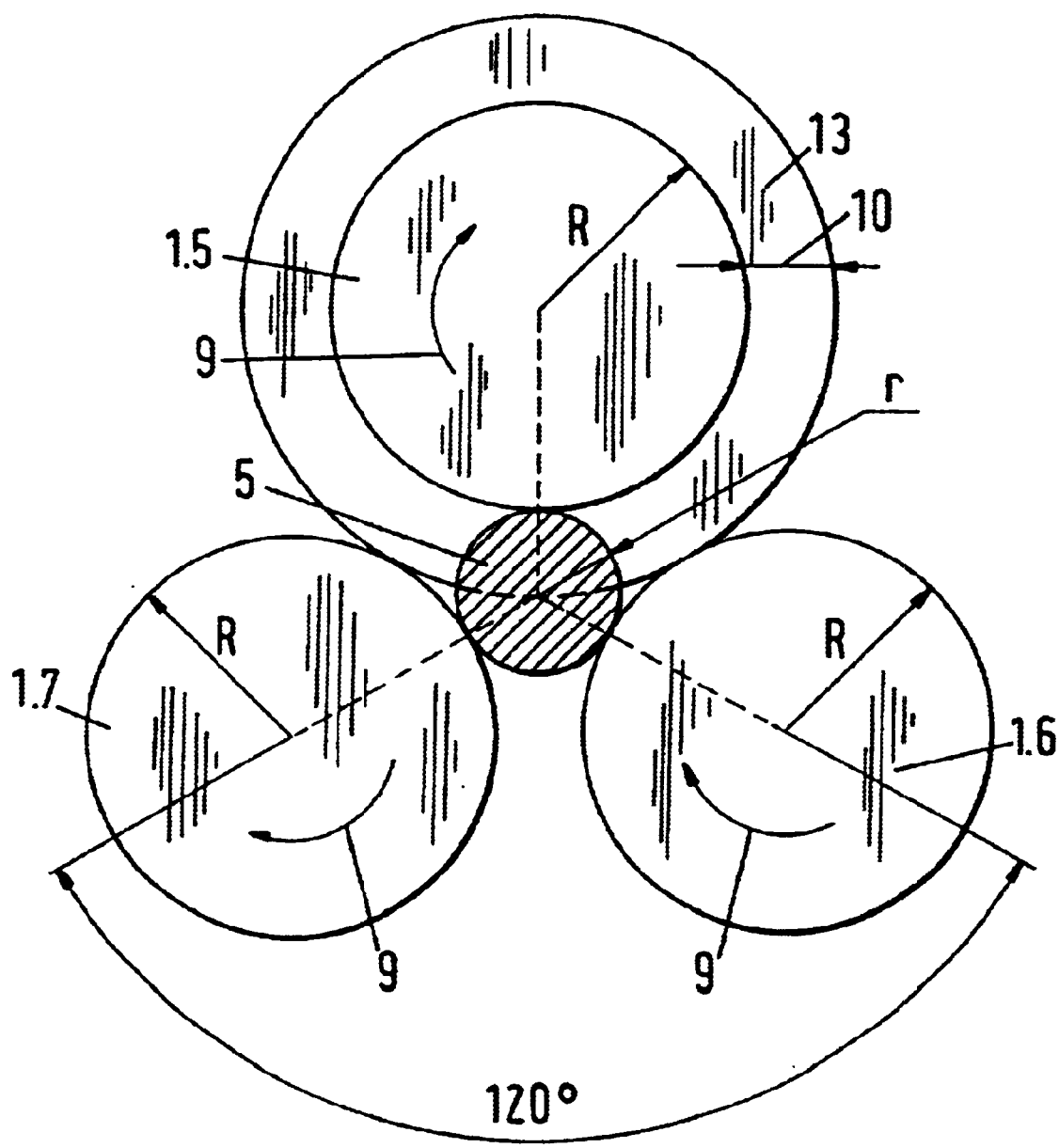
FIG. 5 is a schematic, partially sectional view, of a third embodiment of a separating and rolling device according to the present invention.

Referring now to FIG. 5, there is shown a schematic, partially sectional view, of a third embodiment of a separating and rolling device according to the present invention, having three cutting rollers in 120° offset disposition, thereby defining a top roller 1.5 and two bottom rollers 1.6, 1.7. All three cutting rollers 1.5, 1.6, 1.7 have a same base radius R and, as shown by arrows 9, rotate in a common direction. The increase in height of the coils 2 in the entry portion EA and the primary portion HA (not shown here) is comparable to the embodiments of FIGS. 1 and 3. A collision in the separating portion TA (shown here) is prevented by configuring the cutting edge 13 of the top roller 1.5 at a height 10 which is slightly greater than the radius r of the round bar. The height of the coils 2 of the bottom rollers 1.6, 1.7 in the separating portion TA remains constant and thus no longer increases. To prevent a collision of the cutting edge 13 of the top roller 1.5 with the surface of both bottom rollers 1.6, 1.7, the radius r of the round bar 5 should satisfy the requirement r≧0.366 R, wherein R is the base radius of the cutting rollers 1.5, 1.6, 1.7.

Figure 6:
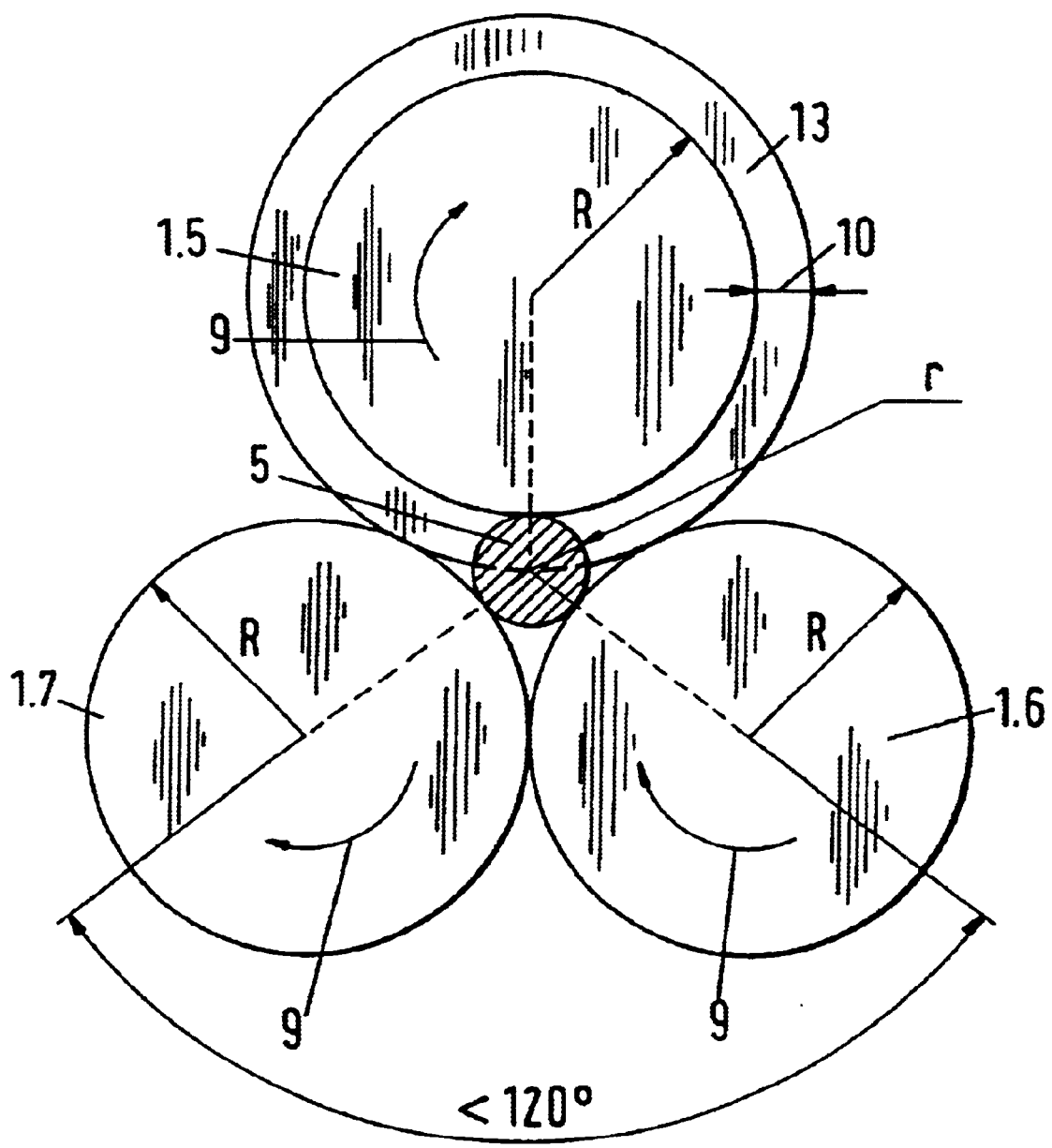
FIG. 6 is a schematic, partially sectional view, of a fourth embodiment of a separating and rolling device according to the present invention.

FIG. 6 shows a variation to decrease the radius r of the round bar 5. Both bottom rollers 1.6, 1.7 are pushed together until their surfaces touch one another. The arrangement of the three cutting rollers 1.5, 1.6, 1.7 is hereby reduced to an angular offset of less than 120°. A collision of the cutting edge 13 of the top roller 1.5 is prevented when the radius r of the round bar 5 satisfies the requirement r≧0.2601 R.

Figure 7:
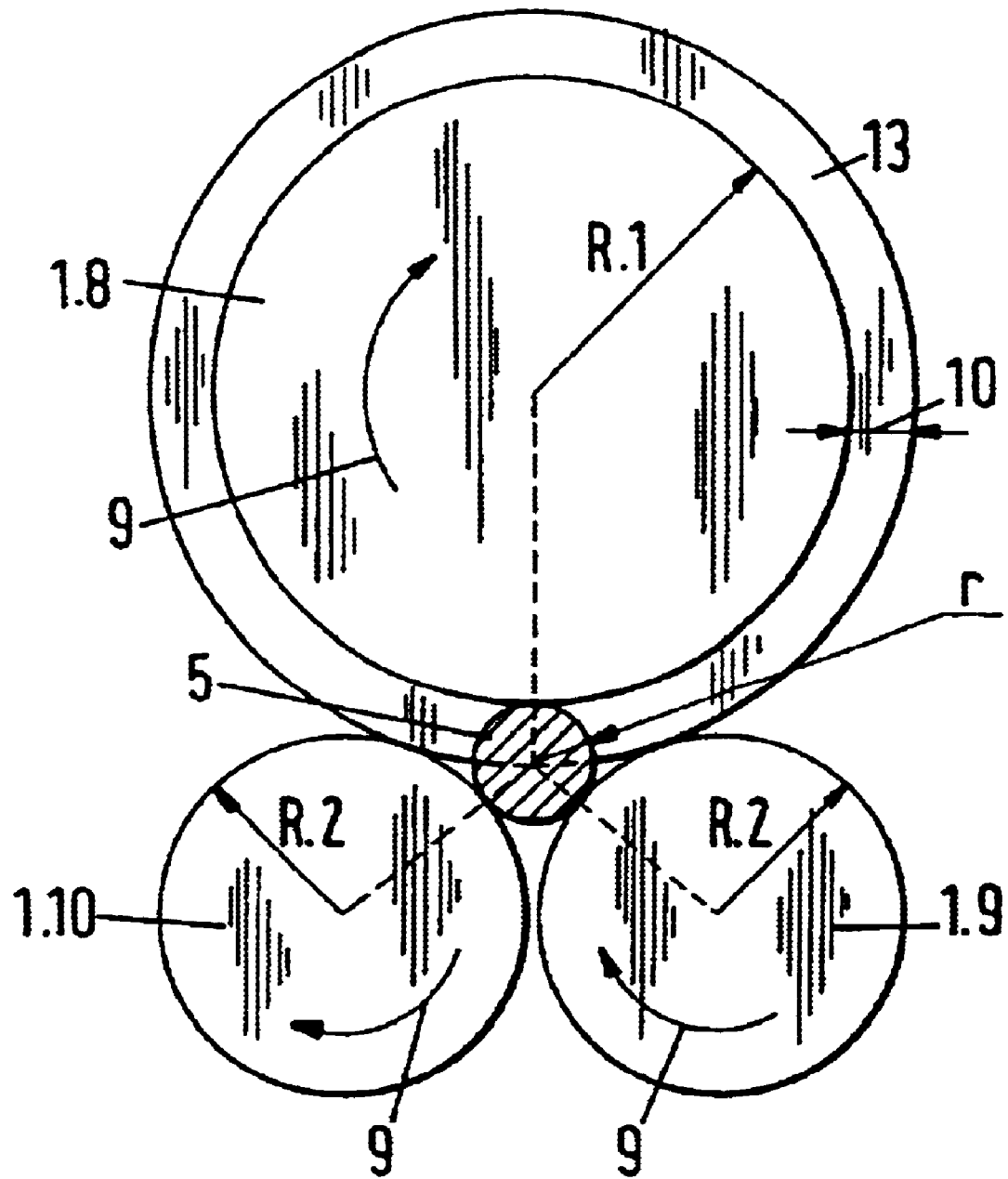
FIG. 7 is a schematic, partially sectional view, of a fifth embodiment of a separating and rolling device according to the present invention.
Figure 8:
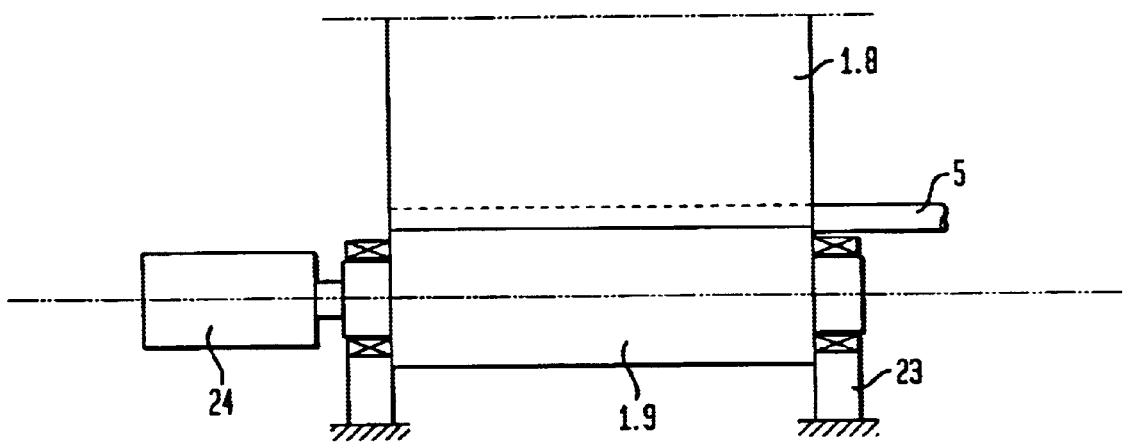
FIG. 8 is a schematic illustration of the arrangement of a separate drive for the separating and rolling device of FIG. 7.

A further minimization of the radius r of the round bar 5 is implemented by the configuration shown in FIG. 7, in which the three cutting rollers 1.8, 1.9, 1.10 have different base radii. The top roller 1.8 has a base radius R.1 which is greater than the base radii R.2 of the bottom rollers 1.9, 1.10, whereby the base radii R.2 of the bottom rollers 1.9, 1.10 are identical. Unlike the embodiment of FIGS. 5 and 6, both bottom rollers 1.9, 1.10 may coast idly or may be driven at matching rotating speed, as shown by way of example in FIG. 8. The bottom rollers 1.9, 1.10 are both supported on a bearing block 23 and rotated by a drive 24, e.g. an electric motor. No positive connection of the three cutting rollers 1.8, 1.9, 1.10 is implemented here.

While the invention has been illustrated and described as embodied in an apparatus for the continuous, chipless separation of individual, identical disk-shaped blanks or rods from round bar-shaped workpieces, it is not intended to be limited to the details shown since various modifications and structural changes may be made without departing in any way from the spirit of the present invention.

What is claimed as new and desired to be protected by Letters Patent is set forth in the appended claims:

1. Apparatus for the continuous, chipless separation of individual, identical disk-shaped blanks or bolts from a round bar-shaped workpiece, comprising:
   an inlet gutter receiving a round bar-shaped workpiece which is defined by a radius;
   a separating and rolling device;
   a feed device for advancing the workpiece from the inlet gutter to the separating and rolling device and imparting a rotation upon the workpiece;
   said separating and rolling device having at least two cutting rollers for processing the workpiece, each of the cutting rollers having a coil and including a separating portion, wherein the coil of each of the at least two cutting rollers has in the separating portion a height which is slightly greater than the radius of the workpiece, wherein the coils are so configured as to avoid in the separating portion a collision with each other;
   a guiding gib for application with the at least two cutting rollers.

2. The apparatus of claim 1, and further comprising an induction heating assembly positioned immediately upstream of the separating and rolling device; and a buffer zone disposed anteriorly of the induction heating.

3. The apparatus of claim 1, wherein the two cutting rollers are disposed in opposite relationship and interconnected in positive manner and driven in a same direction, each of the two cutting rollers including an entry portion and a primary portion, wherein the coil of each of the cutting rollers steadily increases in height in the entry portion and the primary portion up into the separating portion until reaching the height which, slightly exceeds the radius of the workpiece being cut, whereby opposite cutting edges of the coils of the two cutting rollers have tip configurations pointing in opposite directions in a transition area from the primary portion to the separating portion.

4. The apparatus of claim 1, wherein the two cutting rollers are disposed in opposite relationship, each of the two cutting rollers having an entry portion and a primary portion, wherein the coil of each of the cutting rollers steadily increases in height in the entry portion and the primary portion, wherein the coils of the two cutting rollers increase in height in an alternating and oscillating manner in a transition area from the primary portion to the separating portion until reaching the height which slightly exceeds the radius of the workpiece to be cut.

5. The apparatus of claim 1, wherein the guiding gib is configured as endless sliding shoe guided in chain links and conjointly pulled by the coils of the at least two cutting rollers.

6. The apparatus of claim 1, wherein the separating and rolling device has a third cutting roller.

7. The apparatus of claim 1, wherein the cutting rollers rotate about rotation axes which extend in parallel relationship to an advancing direction of the workpiece.

8. A separating and rolling device for use in an apparatus for the continuous, chipless separation of individual, identical pieces from a solid round workpiece, comprising at least two cutting rollers cooperating with one another for separating and rolling a solid round workpiece defined by a radius, each of the cutting rollers defined by a separating portion and having a coil, wherein the coil of each of the cutting rollers has in the separating portion a height which slightly exceeds the radius of the workpiece, wherein the coils are so configured as to eliminate a collision in the separating portion with each other.

9. The device of claim 8, wherein the cutting rollers are disposed in opposing relationship, each of the cutting rollers being defined by an entry portion and a primary portion, wherein the coil of each of the cutting rollers steadily increases in height in the entry portion and the primary portion until reaching in the separating portion the height which slightly exceeds the radius of the workpiece being cut, wherein opposite cutting edges of the coils of the at least two cutting rollers have tip configurations pointing in a transition area from the primary portion to the separating portion in opposite directions.

10. The device of claim 8, wherein the cutting rollers are disposed in opposite relationship and are defined by an entry portion and a primary portion, wherein the coil steadily increases in height in the entry portion and the primary portion, wherein the coils of the two cutting rollers increase in height in an alternating and oscillating manner in a transition area from the primary portion to the separating portion until reaching the height which slightly exceeds the radius of the workpiece to be cut.

11. The apparatus of claim 8, wherein the cutting rollers rotate about rotation axes which extend in parallel relationship to an advancing direction of the workpiece.

* * * * *